United States Patent
Patrizio et al.

(10) Patent No.: US 11,346,605 B2
(45) Date of Patent: May 31, 2022

(54) MELTING METHOD IN AN ELECTRIC ARC FURNACE AND CORRESPONDING APPARATUS

(71) Applicants: DANIELI AUTOMATION S.P.A., Buttrio (IT); DANIELI & C. OFFICINE MECCANICHE S.P.A., Buttrio (IT)

(72) Inventors: Damiano Patrizio, Pagnacco (IT); Antonello Mordeglia, Bangkok (TH)

(73) Assignees: DANIELI AUTOMATION S.P.A., Buttrio (IT); DANIELI & C. OFFICINE MECCANICHE S.P.A., Buttrio (IT)

( * ) Notice: Subject to any disclaimer, the term of this patent is extended or adjusted under 35 U.S.C. 154(b) by 0 days.

(21) Appl. No.: 17/050,834

(22) PCT Filed: Apr. 24, 2019

(86) PCT No.: PCT/IT2019/050080
§ 371 (c)(1),
(2) Date: Oct. 26, 2020

(87) PCT Pub. No.: WO2019/207609
PCT Pub. Date: Oct. 31, 2019

(65) Prior Publication Data
US 2021/0231373 A1   Jul. 29, 2021

(30) Foreign Application Priority Data
Apr. 24, 2018   (IT) .......................... 102018000004847

(51) Int. Cl.
*H05B 7/144* (2006.01)
*F27B 3/08* (2006.01)
*F27B 3/28* (2006.01)

(52) U.S. Cl.
CPC ................ *F27B 3/085* (2013.01); *F27B 3/28* (2013.01); *H05B 7/144* (2013.01)

(58) Field of Classification Search
CPC . F27B 3/085; F27B 3/28; H05B 7/144; H05B 7/148; H05B 7/152; H05B 7/156;
(Continued)

(56) References Cited

U.S. PATENT DOCUMENTS 4,677,643 A * 6/1987 Dicks ..................... H05B 7/156
373/105
4,691,325 A * 9/1987 Boisdon ................. H05B 7/148
373/108

(Continued)

FOREIGN PATENT DOCUMENTS

JP   H02282413 A   11/1990

OTHER PUBLICATIONS

International Search Report and Written Opinion for PCT/IT2019/050080, dated Nov. 19, 2019.

*Primary Examiner* — Hung D Nguyen
(74) *Attorney, Agent, or Firm* — Marshall, Gerstein & Borun LLP

(57) ABSTRACT

A melting method including a step of loading solid metal material into an electric furnace, a step of generating an electric arc between at least one electrode and the metal material, a step of perforating the metal material during which the electrode is moved through the metal material, a step of melting the solid metal material in order to obtain a molten material, and a step of refining the molten material by adding reaction compounds. At least one of the steps includes regulating the electric parameters of the electric arc.

11 Claims, 2 Drawing Sheets

(58) Field of Classification Search
CPC .......... H05B 7/20; Y02P 10/25; Y02P 10/256;
Y02P 10/259; F27D 11/08; F27D 11/10
USPC .... 373/60, 62, 65, 66, 70, 79, 81, 102, 104,
373/108
See application file for complete search history.

(56) References Cited

U.S. PATENT DOCUMENTS

| | | | | |
|---|---|---|---|---|
| 5,438,588 | A | * | 8/1995 | Wanner .................. H05B 7/148 |
| | | | | 373/108 |
| 10,219,331 | B2 | * | 2/2019 | Mordeglia ............... H05B 7/20 |
| 2008/0063024 | A1 | * | 3/2008 | Pasch ..................... H05B 7/148 |
| | | | | 373/105 |

* cited by examiner

MELTING METHOD IN AN ELECTRIC ARC FURNACE AND CORRESPONDING APPARATUS

FIELD OF THE INVENTION

The present invention concerns a melting method in an electric arc furnace and the corresponding melting apparatus.

In particular, the present invention is applied in the field of electric furnaces used to melt metal materials.

Preferred embodiments of the present invention, although non-restrictive, are intended for three-phase electric arc furnaces.

BACKGROUND OF THE INVENTION

The melting cycle of an arc furnace normally provides the following operating steps:

loading metal material, usually scrap, into the furnace by means of baskets that unload from above, or by means of continuous-loading transport apparatuses fed with scrap and/or direct reduced iron (DRI);

generating the electric arc, during which the electrodes are lowered toward the metal material until they trigger the melting electric arc that is generated between the end of the electrodes and the material to be melted;

perforating the layer of metal material by means of the electric arc generated, during which the actual melting of the scrap begins to bring them to complete fusion;

forming the molten metal bath;

refining the molten material to regulate the temperature of the bath and the carbon content of the steel and/or defining a desired composition of the steel by adding chemical components;

tapping the molten material present in the electric furnace, after possible deslagging.

The loading, electric arc generation, and perforating operations can be repeated several times during a single melting cycle. For example, after a first charge of metal material in the furnace and the melting of the charge, the introduction of a further charge of metal material, and the subsequent melting thereof, can be provided before proceeding with the refining of the molten material.

In the case of a continuous charge melting process, the melting cycle described above is different and generally provides loading a first basket into the furnace, the subsequent melting to generate a sufficient liquid heel level and the subsequent continuous introduction of the material to be melted to reach a desired quantity to be tapped.

During the perforation steps, the electric arc between the electrodes and the charge of metal material has a very unstable behavior, which progressively improves as melting proceeds. In the meantime this causes unexpected and sudden changes in the power absorbed which also have negative repercussions on the mains power supply network, with possible damage to the user devices supplied by the latter.

During perforating and melting, in fact, the scrap collected and not yet melted can collapse on the electrodes generating short circuit conditions which correspond to a considerable reduction of the active power useful for the melting operations and a rapid increase of the current absorbed by the mains electric network.

As the melting proceeds, that is, when the arc is appropriately shielded from the solid material or from the foamy liquid (slag), the behavior of the electric arc becomes more and more stable, allowing in this way to increase its length, thus also increasing the thermal power transferred to the material to be melted. The voltage and the length of the arc are regulated as a function of the melting process and so as to prevent excessive wear of the refractory.

Taking into consideration said behaviors of the electric arc during the melting process, therefore, it is known in the state of the art to maintain, at least during the perforating and melting steps, a high current value to ensure that there is no interruption or shutdown of the arc, for example due to the collapse of scrap into the molten bath. The average current value of the arc is however set below a maximum threshold thereof, in order to prevent possible sudden peaks of the arc from somehow damaging the electrical components of the melting apparatus.

Subsequently, during the refining steps, it is known to reduce the current value of the arc, for example by between 10% and 30% to prevent excessive wear of the electrodes, and of the refractory linings of the furnace, due to the high temperature that can be induced by the electrodes themselves as a result of possible surges in current that can occur.

To compensate for the reduction in current, which also entails a reduction in the thermal energy supplied to the melting bath, it is known to add a considerable quantity of chemical compounds to generate endothermic reactions and generate a layer of slag sufficiently thick and such as to guarantee that the molten liquid bath is covered.

In fact, the layer of slag, in addition to protecting the molten bath from oxidation, also acts as a protective shield against the thermal dissipation of the heat of the molten bath.

Furthermore, the reduction of the current intensity entails a higher duration of the melting cycle, that is, of the power-on time, with high production costs.

JP 2282413 describes a system to control the electric power supply to an electric arc furnace, wherein it is provided to improve the power factor during the process in order to increase the efficiency of the plant, which has a power supply directly connected to the mains electric network. The solution described in this document provides to be able to vary the current values during the melting process, but in order to not unbalance the system excessively it continuously requires the use of an overcurrent discharge system in order to maintain the balance of the electric parameters.

One purpose of the present invention is to perfect a melting method in an electric arc furnace which increases the efficiency of the melting process.

Another purpose of the invention is to prefect a melting method in an electric arc furnace which allows to reduce the time of each melting cycle.

Another purpose of the present invention is to perfect a melting method which allows to increase the duration of the electrodes and the refractory linings of the furnace.

Another purpose of the invention is to perfect a melting method which allows to contain the costs associated with the addition of chemical compounds for the generation of slag.

Another purpose of the invention is to provide a melting apparatus which is simple and economical.

Another purpose of the invention is to provide a melting apparatus which is efficient, and reduces the times of each melting cycle.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a melting method according to the present invention comprises:

a step of loading solid metal material into an electric melting furnace;

a step of generating an electric arc between at least one electrode and the metal material;

a step of perforating the metal material during which the electrode is moved through said metal material;

a step of melting the solid metal material in order to obtain a molten material, the melting step providing to keep an electric power current of said electric arc substantially constant over time at a first current value;

a step of refining said molten material by adding reaction compounds.

According to one aspect of the present invention, during said refining step it is provided to increase the electric power current of said electric arc to a second current value comprised between 1.04 and 1.2 times the first current value.

In this way, with the type of electric furnace and the powers involved remaining the same with respect to the state of the art, an increase in the power current of the arc entails a simultaneous reduction of the power voltage of the electric arc.

The power voltage of the electric arc is directly correlated to the length of the electric arc by the empirical relation, perfected by the Applicant, $L_{arc} = V_{arc} - 35$ mm. From this it follows that a reduction in the voltage of the arc also entails a simultaneous reduction in the length of the electric arc. This reduction in the length of the electric arc can be obtained by adjusting the position of the electrode in the electric furnace.

The reduction in the length of the arc allows to reduce the thickness of the slag to be generated above the molten metal in order to protect the electric arc itself. This allows to use fewer chemical reaction compounds to generate the slag, such as by way of example only lime, coal, oxygen, with a consequent reduction of the refining costs.

Furthermore, a smaller quantity of slag and chemical reaction compounds with the molten metal also allows to obtain a greater yield of the molten material tapped with respect to what is loaded into the furnace. The Applicant has also found that the present invention allows a reduction in the melting cycle time.

During the refining step, thanks to the stability of the process, the electric power current is quite stable over time and less subject to sudden increases or reductions. The increase in current, provided in the step of refining the metal, allows to take advantage of its stability without incurring a greater consumption rate of the electrodes.

Furthermore, with the present invention, given the same furnace as the one used in the state of the art, it is also possible to provide an increase of the electric power supplied to the electrodes in the refining step, with a consequent reduction of the time of the melting cycle.

Embodiments of the invention also concern a melting apparatus comprising an electric arc furnace into which metal material is introduced and provided with at least one electrode configured to generate an electric arc toward the metal material, and a command and control unit configured to regulate at least an electric power current of the electric arc.

According to one aspect of the present invention, the melting apparatus comprises a regulation device configured to regulate at least the electric power current of the electric arc during at least a melting step and a refining step and so that the power current is kept at a first current value during the melting step, and during the refining step at a second current value, comprised between 1.04 and 1.2 times the first current value

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
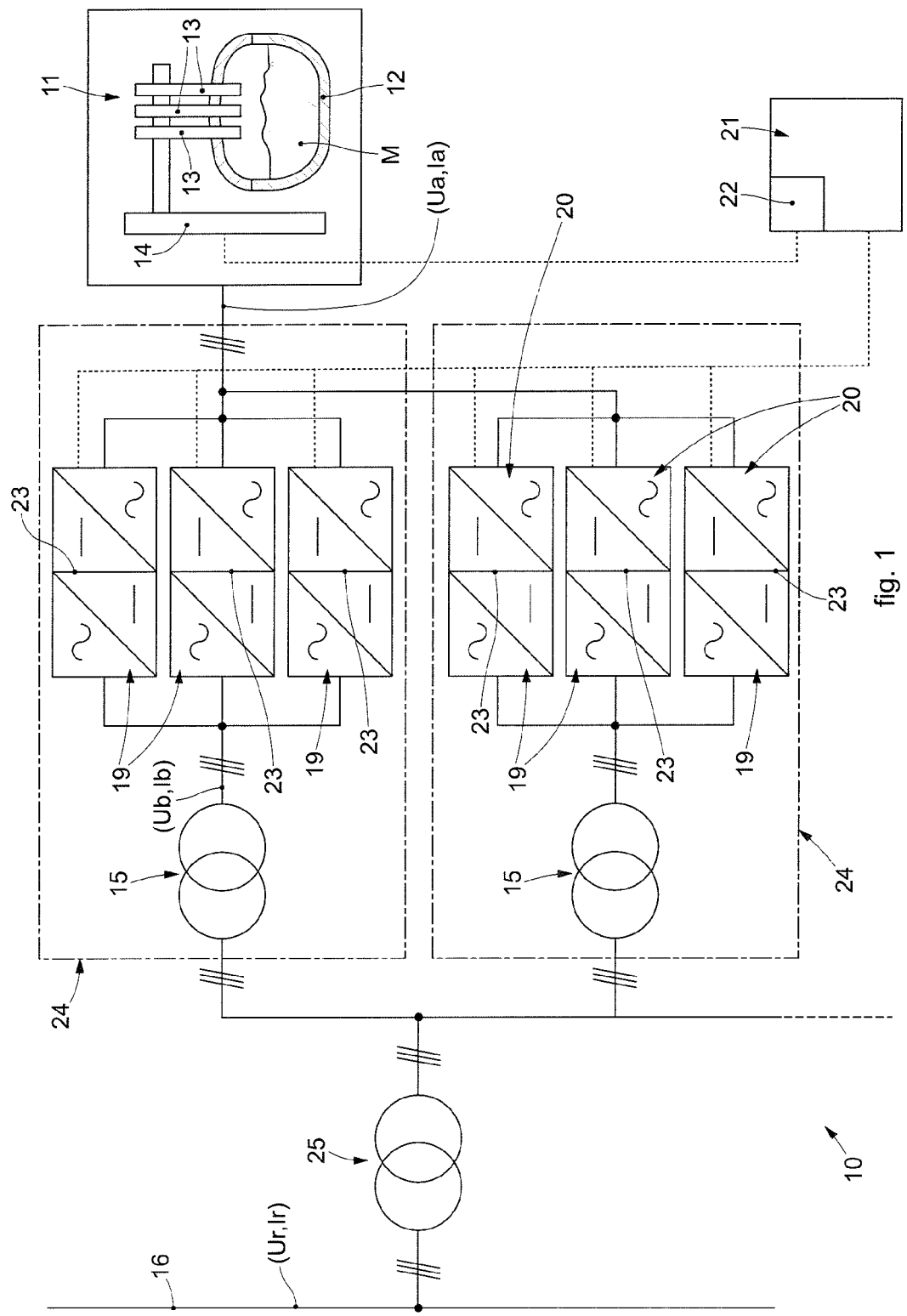
FIG. 1 is a schematic illustration of an electric power apparatus of an electric arc furnace according to some embodiments of the present invention.

Embodiments of the present invention concern a melting apparatus, indicated as a whole with the reference number 10 (FIG. 2) and comprising an electric arc furnace 11.

The electric furnace 11 comprises a container 12, or shell, in which metal material M is introduced to be subsequently melted.

The electric furnace 11 is also provided with at least one electrode 13, in the case shown three electrodes 13, configured to trigger an electric arc through the metal material M and melt it.

According to some embodiments of the present invention, the electrodes 13 are installed on movement devices 14 configured to selectively move the electrodes 13 toward to/away from the metal material M. The movement of the electrodes 13 allows to adapt their position in relation to the specific production steps. In particular, by adjusting the position of the electrodes 13 it is also possible to manage the length of the electric arcs which are established between the electrodes 13 and the metal material M.

In general, the movement devices 14 can provide an independent movement of the electrodes 13 to allow to control the length of the electric arcs generated by each one of them.

In preferred solutions, the position of the electrodes 13 is adjusted so that the electric arcs generated by the electrodes 13 are substantially equal to one another, that is, there are no phase imbalances between the different electrodes.

The movement devices 14 can be chosen from a group comprising at least one of either a mechanical actuator, an electric actuator, a pneumatic actuator, a hydraulic actuator, an articulated mechanism, a mechanical kinematic, similar and comparable members or a possible combination of the above.

According to a possible solution of the present invention, if there are three electrodes 13, each one of them is connected to a respective electric power phase.

According to some embodiments of the present invention, the melting apparatus 10 comprises at least one transformer 15 connected, directly or indirectly, to an electric network 16 that supplies a mains alternating voltage Ur and a mains alternating current Ir and is configured to transform the mains alternating voltage Ur and current Ir into a base alternating voltage Ub and a base alternating current Ib.

According to a possible solution of the invention, the mains electric network 16 can be three-phase.

The base voltage "Ub", and the base current "Ib" are predefined and set by the design characteristics of the transformer 15 itself, that is, by the transformation ratio thereof.

The transformer 15, for example of the multi-tap type, can be provided with regulation devices, not shown, provided to selectively regulate the electrical transformation ratio of the transformer 15 in relation to the specific requirements.

The apparatus 10, according to the present invention, also comprises a plurality of rectifiers 19 connected to the transformer 15 and configured to transform the base alternating voltage Ub and current Ib into direct voltage and current.

Specifically, the rectifiers 19 allow to rectify the base alternating voltage Ub and current Ib, into respective direct voltages and currents.

The rectifiers 19 can be chosen from a group comprising a diode bridge and a thyristor bridge.

According to a possible solution, the rectifiers 19 comprise devices, for example chosen from a group comprising Diodes, SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor) and IGBT (Insulated-Gate Bipolar Transistor).

According to a further aspect of the invention, the apparatus 10 comprises a plurality of converters 20 connected to the rectifiers 19 and configured to convert the direct voltage and current into an electric power voltage "Ua", and an electric power current "Ia", of the electrodes 13.

The electric power voltage "Ua" and the electric power current "Ia" are selectively regulated as described below.

According to a possible solution, the converters 20 comprise devices, for example chosen from a group comprising SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), and IGBT (Insulated-Gate Bipolar Transistor).

The converters 20 are connected to the electrodes 13 of the melting furnace 11 and to a control and command unit 21 configured to control and command the functioning of the converters 20 and to regulate over time the electric power voltage Ua and the electric power current Ia of the electrodes 13.

Specifically, the control and command unit 21 controls said converters 20 so as to selectively set the parameters of said alternating electric power supply.

According to one aspect of the present invention, the control and command unit 21 is provided with regulation devices 22 configured to regulate the electric power current "Ia" and the electric power voltage "Ua" of the alternating electric power supply.

According to possible solutions of the present invention, the regulation devices 22 can include, by way of example only.

According to possible solutions, the rectifiers 19 can be connected to the converters 20 by means of at least one intermediate circuit 23.

The intermediate circuit 23 works in direct current and can comprise, by way of example only, a DC-link.

The intermediate circuit 23 is configured to store electric energy continuously and generate a separation between the electrodes 13 and the rectifiers 19, and therefore with the mains electric network 16.

In particular, the rapid power fluctuations deriving from the process are partly filtered through the intermediate circuit 23 reducing their impact on the electric network 16 side.

The control and command unit 21 can also be connected, in its turn, to the movement device 14 to allow an adjustment of the position of the electrodes 13 in relation to the different steps of the melting process.

In particular, the electrodes 13 are moved by the movement device 14 to follow the position of the material and therefore modify the length of the arc.

In this way the control and command unit 21 can manage and command at least the following parameters, in relation to the specific steps of the process: power voltage Ua, power current Ia, and position of the electrodes 13.

The high possibility of controlling the various parameters allows to optimize the transfer of energy to the process and at the same time to reduce the effects on the electric network 16 deriving from the rapid variations in power on the furnace side.

According to possible embodiments of the present invention, the control and command unit 21 can be configured to also regulate the electric power frequency "fa" of said electric power supply.

According to possible solutions, the transformer 15, the rectifiers 19, connected to the transformer 15, and the converters 20 together define a power module 24.

According to a possible embodiment of the invention, the apparatus 10 can be provided with a plurality of power modules 24, connected in parallel to each other, and to the electric network 16 and to the electric furnace 11.

The combination of several power modules 24 allows to obtain a melting apparatus 10 which is scalable in size according to the specific size of the electric furnace 11 to be powered.

According to a possible solution, the control and command unit 21 is connected to all the power modules 24 to control at least the respective converters 20 so that each module supplies the same voltage Ua, current Ia, and electric power frequency "fa" values to the electrodes 11. In this way it is possible to prevent malfunctioning of the entire system.

According to a possible solution, another transformer 25 can be interposed between the electric network 16 and the power modules 24, provided to convert the electric energy of the network into electric energy to be supplied to the power modules 24.

Embodiments of the invention also concern a melting method which comprises a step of loading solid metal material M into the electric furnace 11.

The loading step can be performed with the use of loading baskets which provide to insert a predefined quantity of metal material M into the electric furnace 11.

According to possible variant embodiments, the step of loading the metal material M can occur substantially continuously, for example with the aid of vibrating conveyors or conveyor belts.

In the case of substantially continuous loading, it can be provided that before the perforation step begins, a predefined quantity of metal material M is loaded, which is a fraction of the total quantity that will be loaded into the electric furnace 11. The loading can be performed by one or more baskets or by the same conveyors used for the continuous loading.

Subsequently the perforation step is started. During the perforation step and the melting step, a substantially continuous loading of further metal material M into the electric furnace 11 is provided, which continues until the beginning of, or just before, the step of refining the metal material M.

Although in the continuation of the description, and with reference to FIGS. 2-6, we refer to a process with discontinuous loading, it is not excluded that such considerations, as well as the trends of the parameters identified in FIGS. 2-6, can also be adopted for the melting process with continuous loading.

In the case of a melting process with continuous loading, the step of melting the metal material has a longer duration than that shown in FIGS. 2-6. By way of example only, in the case of continuous loading the duration of the melting step is at least three times the duration of the refining step.

The method according to the present invention also provides a step of generating an electric arc between each one of the electrodes 13 and the metal material M in order to start a step of melting the latter.

Figure 2:
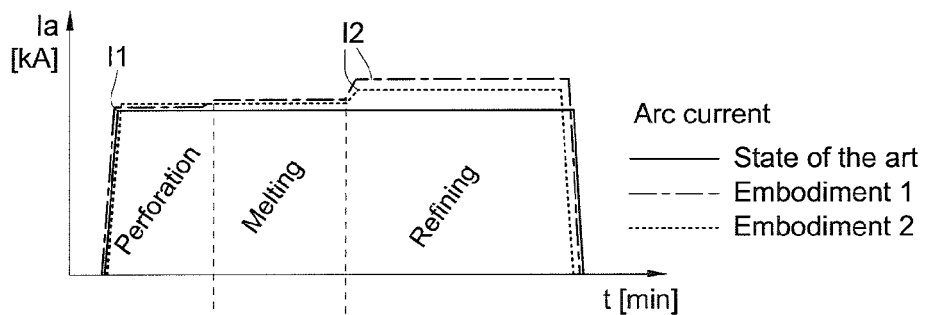
FIG. 2 shows the variation in time of the electric power current of the arc in known solutions in the state of the art (continuous line) and in two possible embodiments according to the present invention (dotted and dash-dotted lines), during the steps of loading, perforating, melting, and refining the last basket of a casting.

According to one aspect of the present invention, said step of melting the solid metal material M allows to obtain molten material, and during this melting it is provided to maintain the electric power current Ia substantially constant over time at a first current value I1 (FIG. 2).

By way of example only, the first current value I1 can be comprised between 40 kA and 70 kA for a 100 ton electric furnace.

According to possible embodiments of the invention, a step of perforating the metal material is provided between the step of generating the electric arc and the melting step, during which the electrodes 13 are moved through the metal material M causing its consequent melting. As the metal material M gradually melts the electrodes 13 penetrate the still solid part of the metal material M to progressively melt it. When the electrodes 13 reach a position inside the container 12, the real melting of the remaining metal material M surrounding the electrodes 13 begins.

According to a possible solution, the perforation step and the melting step can be repeated several times before the final refining of the molten material, and between them a step of loading further metal material M into the electric furnace 11 is provided. In this way it is possible to obtain a complete loading of the electric furnace 11 until it reaches its total capacity.

Figure 3:
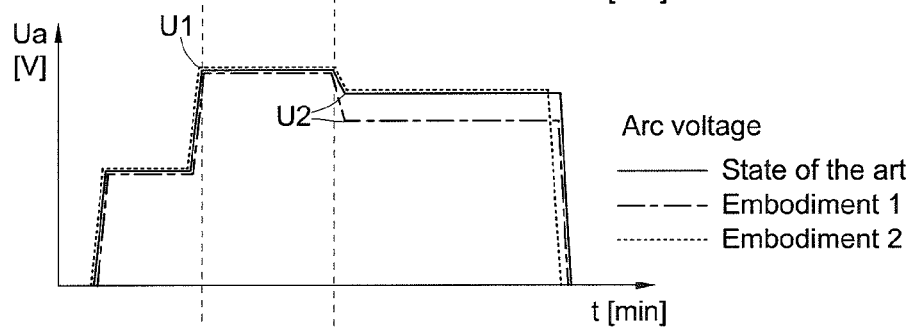
FIG. 3 shows the variation in time of the electric voltage of the arc in known solutions in the state of the art (continuous line) and in two possible embodiments according to the present invention (dotted and dash-dotted lines), during the steps of loading, perforating, melting, and refining the last basket of a casting.
Figure 4:
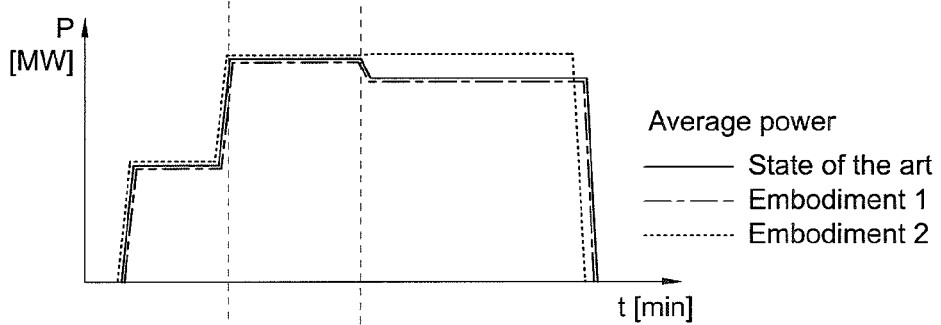
FIG. 4 shows the variation in time of the average electric power of the arc in known solutions in the state of the art (continuous line) and in two possible embodiments according to the present invention (dotted and dash-dotted lines), during the steps of loading, perforating, melting, and refining the last basket of a casting.
Figure 5:
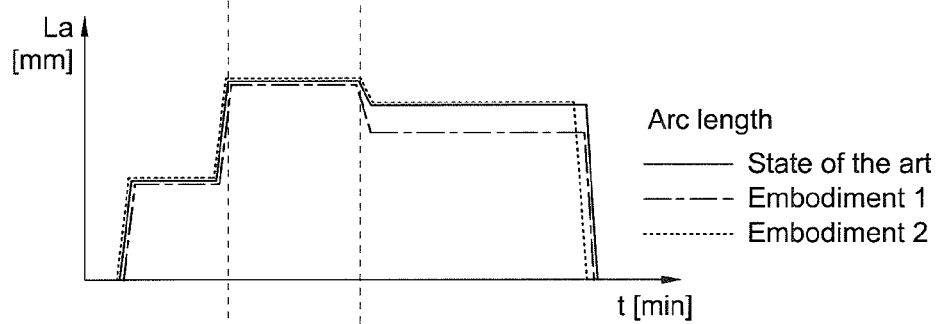
FIG. 5 shows the variation in time of the length of the arc in known solutions in the state of the art (continuous line) and in two possible embodiments according to the present invention (dotted and dash-dotted lines), during the steps of loading, perforating, melting, and refining the last basket of a casting.
Figure 6:
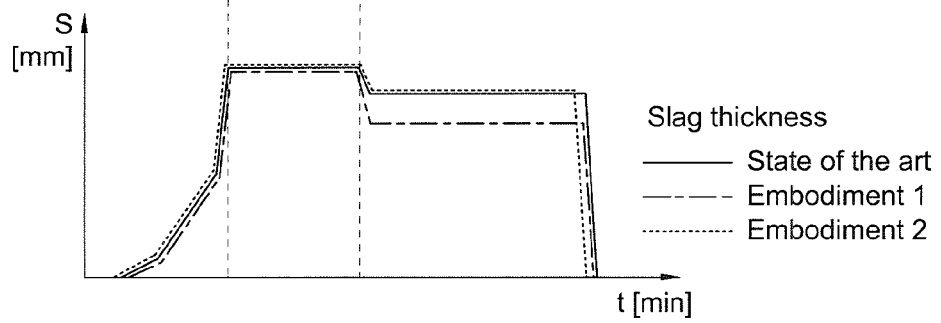
FIG. 6 shows the variation in time of the thickness of the slag in known solutions in the state of the art (continuous line) and in two possible embodiments according to the present invention (dotted and dash-dotted lines), during the steps of loading, perforating, melting, and refining the last basket of a casting.

During the perforation step, the power current "Ia" is kept substantially equal to said first current value I1 (FIG. 2), while the power voltage "Ua" has a value comprised between 0.3 and 0.7, preferably between 0.4 and 0.6 times the power voltage Ua applied during the melting (FIG. 3). From this it follows that also the average electric power (FIG. 4) has a trend substantially similar to that of the power voltage Ua.

During the perforation step, the maintenance of a limited electric power allows to compensate for possible surges in power that could occur due to possible short circuits between the electrodes 13. This prevents damage to the electrical components of the melting apparatus 10.

The length of the electric arc (FIG. 5), during the perforation step, is comprised between 0.3 and 0.7 times the length of the electric arc present during the melting step. This prevents, during the perforation step, any unwanted switching off of the electric arc with consequent reduction of the melting efficiency.

Following the complete melting of the metal material M, the refining of the molten material is provided, which provides to add reaction compounds to the latter.

The reaction compounds can comprise, by way of example only, coal, lime, oxygen, alloy elements such as nickel, chrome, molybdenum, vanadium, silica, or suchlike.

The reaction compounds can be provided to modify the composition of the molten material and to generate a layer of protective slag which is disposed above and to protect the molten material.

The slag layer, in fact, generates a barrier against the oxidation of the molten metal material, and acts as a shield against the irradiation of heat toward the exterior.

According to one aspect of the present invention, during the refining it is provided to increase the electric power current "Ia" of the electric arc to a second current value I2 (FIG. 2) which is comprised between 1.04 and 1.2 times the first current value I1 provided during the melting.

The increase of the power current I1 allows to increase the heat input supplied by the electrodes 13 during the melting.

According to a possible solution of the invention, the second current value I2 is comprised between 1.05 and 1.15 times the first current value I1 provided during the melting.

According to a first embodiment of the present invention, shown in FIGS. 2-6 with a dash-dotted line, it is provided that during the melting the power voltage Ua is maintained at a first voltage value U1, and that during the refining step it is maintained at a second value U2 comprised between 0.6 and 0.85 times the first voltage value U1.

According to this first embodiment (FIG. 4), during the refining step it is provided to reduce the electric power supplied to the electrodes 13 by a value comprised between 7% and 15% with respect to the electric power supplied to the electrodes 13 during the melting step.

A reduction in the power voltage Ua during the refining step allows to reduce the length of the electric arc with respect to the length applied during the melting step.

By way of example only, it can be provided that the length of the electric arc during the refining step is comprised between 0.6 and 0.85 times the length of the arc during the melting step.

The reduction in the length of the arc allows to increase the efficiency of current transmission to the molten metal and therefore increases the heating efficiency.

A reduction in the length of the arc between the melting step and the refining step allows to reduce the thickness of the slag layer above the molten metal. This allows to reduce the quantity of reaction compounds to be introduced into the electric furnace and at the same time also allows to increase the yield of the metal material M introduced into the electric furnace 11.

According to a possible solution of the invention, the slag layer during the refining step has a thickness comprised between 0.5 and 0.85 times the thickness of the slag layer provided during the melting step.

According to a second embodiment of the invention, shown in FIGS. 2-6 with a dotted line, it is provided that the power voltage Ua of the electrodes 13 is regulated so that the electric power applied to the electrodes 13 during the refining step is comprised between 0.9 and 1.1 times the electric power applied to the electrodes during the melting step.

This solution of the present invention allows to reduce the melting cycle time by about 3% with a rather significant annual energy saving.

According to this solution, it can be provided that the power voltage Ua during said melting step is maintained at a first voltage value U1 and in said refining step at a second voltage value U2 comprised between 0.8 and 0.95 times the first voltage value U1.

According to this second embodiment, it can be provided that the second current value I2 is comprised between 1.12 and 1.17 times the first current value I1.

According to this solution, it can be provided that the length of the electric arc during the refining step is comprised between 0.8 and 0.95 times the length of the arc during the melting step.

According to this second solution, the slag layer, during the refining step, has a thickness comprised between 0.8 and 0.95 times the slag layer provided during said melting step.

Tables 1-6 below show a comparison between the different functioning electric parameters of a melting apparatus according to the state of the art, according to the first embodiment and to the second embodiment described above according to the present invention. Specifically, the values reported all refer to a melting apparatus with a melting furnace with a capacity of 100 tons.

TABLE 1

Average power [MW]

| | State of the art | Embodiment 1 | Embodiment 2 |
|---|---|---|---|
| Perforation | 38 | 38 | 38 |
| Melting | 72.2 | 72.2 | 72.2 |
| Refining | 66 | 66 | 72.6 |

TABLE 2

Maximum power [MW]

| | State of the art | Embodiment 1 | Embodiment 2 |
|---|---|---|---|
| Perforation | 42.2 | 42.2 | 42.3 |
| Melting | 76 | 76 | 76 |
| Refining | 68 | 68 | 74.8 |

TABLE 3

Current [kA]

| | State of the art | Embodiment 1 | Embodiment 2 |
|---|---|---|---|
| Perforation | 54.9 | 54.9 | 54.9 |
| Melting | 54.9 | 54.9 | 54.9 |
| Refining | 54.9 | 63 | 60 |

TABLE 4

Voltage [V]

| | State of the art | Embodiment 1 | Embodiment 2 |
|---|---|---|---|
| Perforation | 235 | 235 | 235 |
| Melting | 440 | 440 | 440 |
| Refining | 392 | 335 | 392 |

TABLE 5

Arc length [mm]

| | State of the art | Embodiment 1 | Embodiment 2 |
|---|---|---|---|
| Perforation | 200 | 200 | 200 |
| Melting | 405 | 405 | 405 |
| Refining | 357 | 300 | 357 |

TABLE 6

Slag thickness [mm]

| | State of the art | Embodiment 1 | Embodiment 2 |
|---|---|---|---|
| Perforation | 210 | 210 | 210 |
| Melting | 425.3 | 425.3 | 425.3 |
| Refining | 374.7 | 315.2 | 375 |

It is clear that modifications and/or additions of parts may be made to the melting method and corresponding apparatus 10 as described heretofore, without departing from the field and scope of the present invention.

It is also clear that, although the present invention has been described with reference to some specific examples, a person of skill in the art shall certainly be able to achieve many other equivalent forms of melting method and corresponding apparatus 10, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A melting method comprising:
a step of loading solid metal material into an electric furnace;
a step of generating an electric arc between at least one electrode and the metal material;
a step of perforating the metal material during which said electrode is moved through said metal material;
a step of melting the solid metal material in order to obtain a molten material, said melting step providing to keep an electric power current of said electric arc substantially constant over time at a first current value;
a step of refining said molten material by adding reaction compounds,
wherein an electric power supply to said electric furnace provides the transformation, with at least one transformer, of a mains alternating voltage and a mains alternating current into a base alternating voltage and a base alternating current;
rectifying said base voltage and base current with rectifiers in order to obtain a direct electric voltage and current;
converting, with converters, said direct voltage and electric current into a power voltage and power current;
wherein during said refining step includes increasing the electric power current of said electric arc to a second current value comprised between 1.04 and 1.2 times the first current value, and in that the rectifiers are connected to the converters by at least one intermediate circuit which works in direct current, wherein the intermediate circuit stores electrical energy continuously and generates a separation between the electrodes and the rectifiers, and therefore with the mains electric network.

2. The melting method as in claim 1, wherein said second current value is comprised between 1.05 and 1.15 times said first current value.

3. The melting method as in claim 1, wherein a power voltage is applied to said at least one electrode, and in that during said melting step said power voltage is maintained at a first voltage value and in said refining step at a second voltage value comprised between 0.6 and 0.85 times said first voltage value.

4. The melting method as in claim 3, wherein during the refining step it is provided to reduce the electric power fed to the electrodes by a value comprised between 7% and 15% with respect to the electric power fed to the electrodes during the melting step.

5. The melting method as in claim 3, wherein the length of the electric arc during said refining step is comprised between 0.6 and 0.85 times the length of the arc during said melting step.

6. The melting method as in claim 3, wherein a layer of slag is generated above said molten material, and in that during the refining step, the thickness of said layer of slag is comprised between 0.5 and 0.85 times the thickness of said layer of slag provided during said melting step.

7. The melting method as in claim 1, includes regulating the electric power voltage of said at least one electrode so that the electric power applied to said electrode during the refining step is comprised between 0.9 and 1.1 times the electric power applied to said electrode during the melting step.

8. The melting method as in claim 7, wherein the length of the electric arc during said refining step is comprised between 0.8 and 0.95 times the length of the arc during said melting step.

9. The melting method as in claim 7, wherein during said refining step said layer of slag has a thickness comprised between 0.8 and 0.95 times the thickness of the layer of slag provided during said melting step.

10. The melting method as in claim 1, wherein during said perforation step said power current is kept substantially equal to said first current value and said power voltage has a value comprised between 0.3 and 0.7 times the power voltage applied during melting.

11. A melting apparatus comprising an electric arc furnace into which metal material is introduced and provided with at least one electrode configured to generate an electric arc toward said metal material, and a command and control unit configured to regulate at least an electric power current of said electric arc, the apparatus further comprising a transformer connected to an electric network to supply a mains alternating voltage and a mains alternating current, said transformer being configured to transform said mains voltage and said mains current into an alternating base voltage and base current respectively;

a plurality of rectifiers connected to the transformer and configured to transform said base voltage and said base current into direct voltage and electric current;

a plurality of converters connected to said rectifiers and configured to convert direct voltage and current into an alternating power voltage and current, comprising a regulation device configured to regulate at least said electric power current of said electric arc during at least a melting step and a refining step and so that said power current is kept at a first current value during said melting step, and during said refining step at a second current value, comprised between 1.04 and 1.2 times the first current value, and in that the apparatus further comprises at least one intermediate circuit, which connects the rectifiers to the converters, and works in direct current, wherein the intermediate circuit is configured to store electric energy continuously and to generate a separation between the electrodes and the rectifiers, and therefore with the mains electric network.

* * * * *